United States Patent
Yamada et al.

(10) Patent No.: US 9,804,023 B2
(45) Date of Patent: Oct. 31, 2017

(54) GLARE MEASURING SYSTEM

(71) Applicant: IWASAKI ELECTRIC CO., LTD., Tokyo (JP)

(72) Inventors: Tetsuji Yamada, Tokyo (JP); Kosuke Oshima, Tokyo (JP)

(73) Assignee: IWASAKI ELECTRIC CO., LTD., Tokyo (JP)

( * ) Notice: Subject to any disclaimer, the term of this patent is extended or adjusted under 35 U.S.C. 154(b) by 259 days.

(21) Appl. No.: 14/384,959

(22) PCT Filed: Feb. 25, 2013

(86) PCT No.: PCT/JP2013/054690
§ 371 (c)(1),
(2) Date: Sep. 12, 2014

(87) PCT Pub. No.: WO2013/150830
PCT Pub. Date: Oct. 10, 2013

(65) Prior Publication Data
US 2015/0035972 A1   Feb. 5, 2015

(30) Foreign Application Priority Data
Apr. 5, 2012  (JP) .................................. 2012-086169

(51) Int. Cl.
*H04N 5/265* (2006.01)
*G01J 1/42* (2006.01)
(Continued)

(52) U.S. Cl.
CPC .............. *G01J 1/42* (2013.01); *G06T 7/0002* (2013.01); *H04N 5/2251* (2013.01); *H04N 5/265* (2013.01); *G06T 2207/30168* (2013.01)

(58) Field of Classification Search
CPC .................. H04N 5/2251; H04N 5/265; G06T 2207/30168; G06T 7/0002
(Continued)

(56) References Cited

U.S. PATENT DOCUMENTS

| 2002/0171824 | A1 | 11/2002 | Overbeck et al. |
| 2009/0201360 | A1 | 8/2009 | McClatchie |
| 2010/0302347 | A1* | 12/2010 | Shikata .................. H04N 5/232 348/36 |

FOREIGN PATENT DOCUMENTS

| CN | 101902571 A | 12/2010 |
| CN | 102183301 | * 9/2011 |

(Continued)

OTHER PUBLICATIONS

Translation of CN 102183301, Sep. 2011, Cao, Miao, China.*
(Continued)

*Primary Examiner* — Jamie Atala
*Assistant Examiner* — Kathleen Nguyen
(74) *Attorney, Agent, or Firm* — Leason Ellis LLP

(57) ABSTRACT

A glare measuring system is configured to have an imaging camera which is supported to be rotatable within a horizontal plane, and a processing device which calculates equivalent veiling luminance on the basis of a pickup image of the imaging camera and calculates the value of a glare rating GR on the basis of the equivalent veiling luminance. The imaging camera has a super-wide-angle lens mounted thereon, and picks up an image in a position which is rotated within the horizontal plane by every angle corresponding to the angle of view α of the super-wide-angle. The processing device combines pickup images to generate a composite image in which a glare measurement direction is set to the center of the composite image, calculates equivalent veiling luminance on the basis of the composite image, and calculates the value of the glare rating in the glare measurement direction.

8 Claims, 6 Drawing Sheets

(51) Int. Cl.
*G06T 7/00* (2017.01)
*H04N 5/225* (2006.01)

(58) Field of Classification Search
USPC .......................................... 348/135
See application file for complete search history.

(56) References Cited

FOREIGN PATENT DOCUMENTS

| CN | 102183301 A | | 9/2011 |
|---|---|---|---|
| JP | 2004-087215 | * | 3/2004 |
| JP | 2004-087215 A | | 3/2004 |
| JP | 2008-241380 | * | 10/2008 |
| JP | 2008-241380 A | | 10/2008 |
| JP | 2010-278587 A | | 12/2010 |

OTHER PUBLICATIONS

Translation of JP 2008-241380, Oct. 2008, Koji, Kawakami, Japan.*
Translation of JP 2004-087215, Oct. 2008, Koji, Kawakami, Japan.*
Office Action mailed Dec. 8, 2015 for the corresponding Japanese Application No. 2012-086169.
Office Action mailed Jul. 21, 2015 for the corresponding Chinese Application No. 201380017603.6.
Oshima et al., "Shashin Sokko ni yoru Toka Komaku Kido Sokutei—Gyogan Lens o Mochiita Toka Komaku Kido no Sanshutsu Hoho-", *Iwasaki Electric Technical Reports*, Dec. 26, 2011, No. 25, pp. 13-19 (See attached ISR for relevancy).
Oshima et al., "Shashin Sokko ni yoru Toka Komaku Kido Sokutei—Gyogan Lens o Mochiita Toka Komaku Kido no Sanshutsu Hoho sono 2-", *Iwasaki Electric Technical Reports*, Jun. 29, 2012, No. 26, pp. 2-7 (See attached ISR for relevancy).
Oshima et al., "Shashin Sokko ni yoru Toka Komaku Kido Sokutei—Sports Shomei Shisetsu ni Okeru Glare Hyoka-", *Iwasaki Electric Technical Reports*, Dec. 28, 2012, No. 27, pp. 11-15 (See attached ISR for relevancy).
International Search Report mailed Jun. 4, 2013 for the corresponding PCT Application No. PCT/JP2013/054690.
International Preliminary Report on Patentability mailed Oct. 16, 2014 for the corresponding PCT Application No. PCT/JP2013/054690.

* cited by examiner

GLARE MEASURING SYSTEM

CROSS-REFERENCE TO RELATED PATENT APPLICATIONS

This application is a U.S. National Phase Application under U.S.C. §371 of International Patent Application No. PCT/JP2013/054690, filed Feb. 25, 2013, and claims the benefit of Japanese Patent Application No. 2012-086169, filed on Apr. 5, 2012, all of which are incorporated by reference in their entirety herein. The International Application was published in Japanese on Oct. 10, 2013 as International Publication No. WO/2013/150830 under PCT Article 21(2).

FIELD OF THE INVENTION

The present invention relates to a glare measuring technique, and particularly to a technique for suitably measuring glare of a broad lighting target area.

BACKGROUND OF THE INVENTION

With respect to glare estimation of outdoor sports facilities such as athletic fields, sports stadiums, etc., for example, JIS 29110 (JIS: Japanese Industrial Standards) (which corresponds to CIE112-1994 (CIE: Commission Internationale de l'Eclairage)) adopts, as an index value, a glare rating which represents a glare level with a numerical value between 0 and 100, and standard values of the glare rating are set for these outdoor sports facilities. The standard value of the glare rating is set by defining the maximum value of glare ratings in all horizontal directions around an observation point at the height of a player's visual line in the outdoor sports facilities so that glare does not become an obstacle to players. Accordingly, when glare estimation is performed, a worker repetitively measures glare gratings while changing his/her visual-line direction (measurement direction) within a horizontal plane around the observation point, and compares the maximum value of the measurement values of the glare ratings with the standard value to perform the glare estimation.

The measurement of glare ratings is generally performed by mounting a lens having a special optical characteristic called as a glare lens to a luminance meter, measuring equivalent veiling luminance and calculating the glare ratings on the basis of the equivalent veiling luminance according to a predetermined calculation. However, a glare lens having high precision is very expensive, and thus there has been recently proposed a technique of determining equivalent veiling luminance through image processing on the basis of a luminance distribution of an image picked up by an imaging camera (see JP-A-2004-087215, JP-A-2008-241380, for example).

Problem to be Solved by the Invention

However, as described above, it is necessary to measure glare ratings in all the horizontal directions for the glare estimation of outdoor sports facilities. Accordingly, when glare ratings are determined on the basis of an image picked up by an imaging camera, the imaging cameras are required to be set up while facing each direction, and thus the number of imaging cameras increases, which causes increase of the cost.

The present invention has been implemented in view of the foregoing situation, and has an object to provide a glare measuring system that can measure glare required for glare estimation at low cost.

SUMMARY OF THE INVENTION

Means of Solving the Problem

In order to attain the above object, according to the present invention, there is provided a glare measuring system comprising: imaging means that is supported to be rotatable within a flat plane; and processing means that calculates equivalent veiling luminance on the basis of an image picked up by the imaging means and calculates a value of glare on the basis of the equivalent veiling luminance, wherein the imaging means has a wide-angle lens mounted thereon and picks up the image through the wide-angle lens in a position that is rotated within the flat plane at intervals of an angle corresponding to an angle of view of the wide-angle lens, and the processing means combines images picked up by the imaging means to generate an image in which a glare measurement direction set within the flat plane is set to the center of the image, calculates equivalent veiling luminance on the basis of the image and calculates a value of glare in the glare measurement direction on the basis of the equivalent veiling luminance.

Furthermore, according to the present invention, in the glare measuring system, the processing means successively calculates the value of glare in all directions within the flat plane at intervals of a predetermined angle.

Still furthermore, according to the present invention, in the glare measuring system, the processing means calculates at least one of a glare rating used for glare estimation of sports lighting, disability glare used for glare estimation of road lighting and discomfort glare as the value of the glare.

Effect of the Invention

According to the present invention, the wide-angle lens is mounted on the imaging means, and imaging is performed in all the directions within the flat plane through the wide-angle lens in a position which is rotated within the flat plane at intervals of the angle corresponding to the angle of view of the wide-angle lens. Therefore, as compared with a case where imaging is performed through a normal lens having a small angle of view, the number of pickup images can be reduced, and the processing can be reduced. Furthermore, all the directions within the flat plane can be imaged by one imaging camera, and thus the cost can be reduced.

The processing means combines images picked up by the imaging means to generate an image in which the glare measurement direction in a measurement target space is set to the center, calculates equivalent veiling luminance on the basis of the image, and calculates glare in the glare measurement direction on the basis of the equivalent veiling luminance. Therefore, the glare measurement direction can be set to any direction in the measurement target space, and the glare rating in that direction can be easily determined. Since the angle of view of the image picked up at this time is large, the number of images to be combined with one another can be reduced, and the processing can be further reduced.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Mode for Carrying Out the Invention

An embodiment according to the present invention will be described hereunder with reference to the drawings.

In this embodiment, glare estimation for lighting for sports in a baseball field as an example of a sports stadium will be described.

Figure 1:
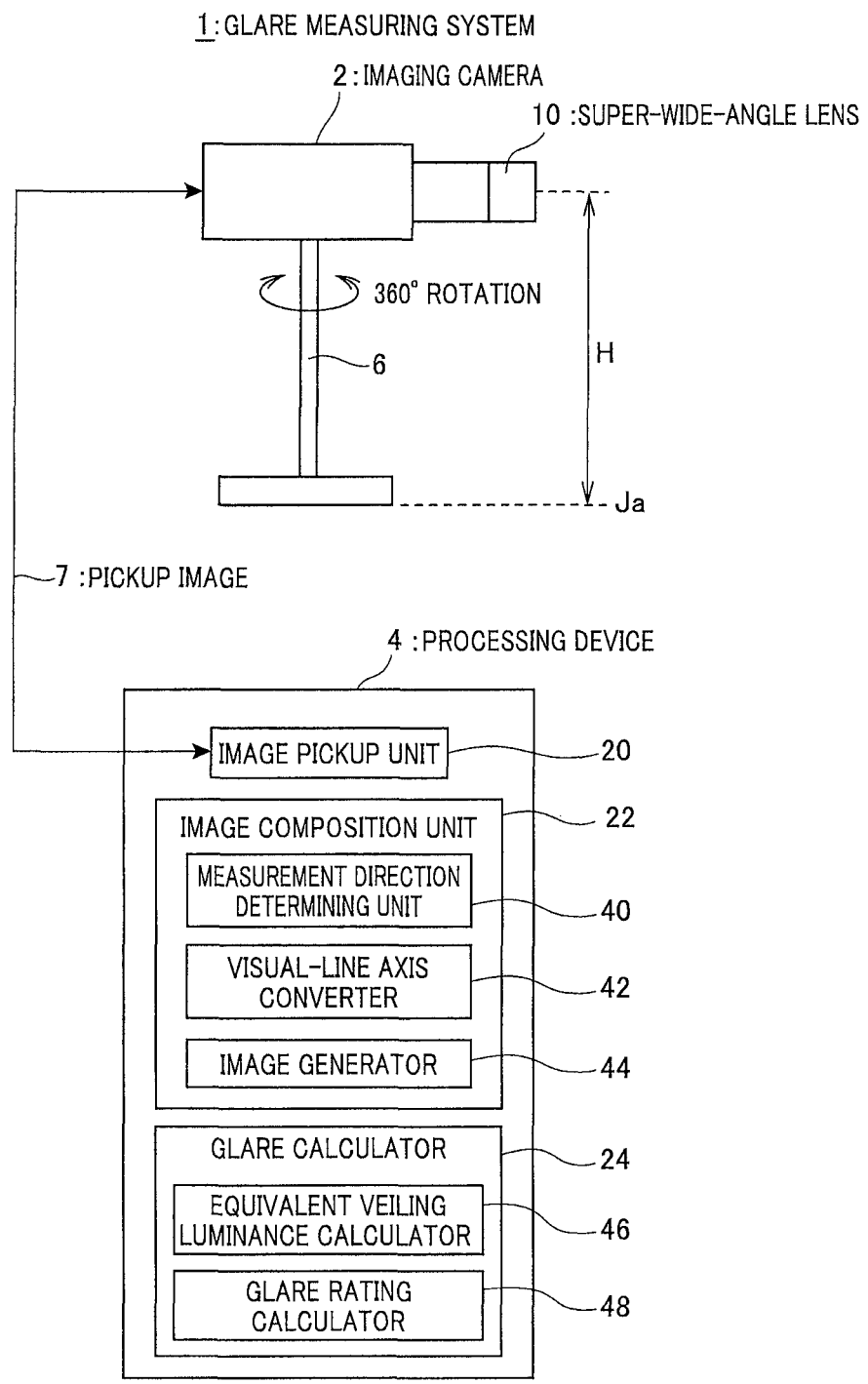
FIG. 1 is a diagram showing the functional construction of a glare measuring system according to an embodiment of the present invention.
Figure 2:
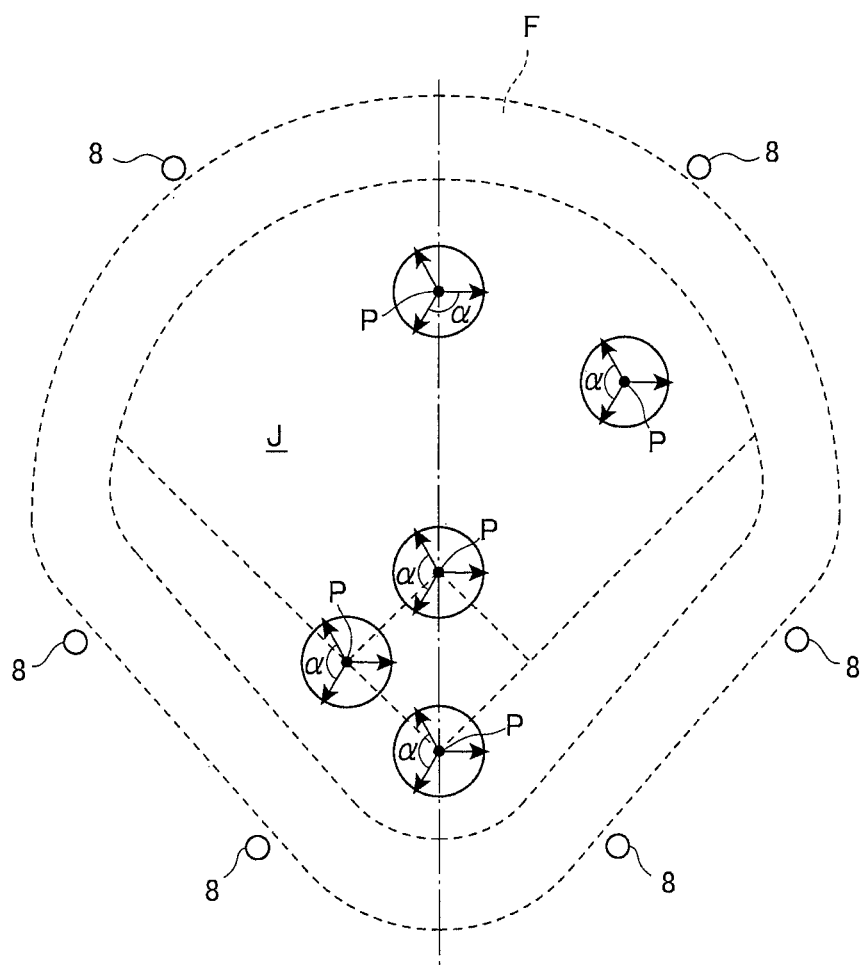
FIG. 2 is a diagram showing a baseball field as a glare estimation target.

FIG. 1 is a diagram showing the functional construction of a glare measuring system 1 according to the embodiment, and FIG. 2 is a diagram showing the baseball field as a glare estimation target.

As shown in the figures, the glare measuring system 1 has an imaging camera 2 and a processing device 4.

As shown in FIG. 2, the imaging camera 2 is disposed at an observation point P within the ground J of the baseball field F while supported at a predetermined height H from the ground surface Ja of the ground J by a support member 6 such as a tripod stand or the like, and performs imaging in a direction which the imaging camera 2 faces, thereby generating a pickup image 7 (FIG. 1). The height H is generally set to the height of the visual line of players as actors who use the ground J.

The baseball field F is lighted from many directions by plural lighting equipment 8 disposed around the ground J. Therefore, for the glare estimation, observation points P are sprinkled at plural places within the ground J and the glare estimation is performed at each observation point P.

The processing device 4 is a device for determining the values of glare ratings GR in all horizontal directions at the observation point P on the basis of image pickup images 7 of the imaging camera 5, and the worker estimates the glare at the observation point P of the baseball field F by comparing the values of the glare ratings GR with a standard value preset for the baseball field F.

Here, it is considered that the measurement of the values of the glare ratings GR in all the horizontal directions at the observation point P is most simply performed by a configuration that plural imaging cameras which are different from one another in imaging direction are arranged at the observation point P. However, the arrangement of the plural imaging cameras at the observation point P causes increase of the cost.

Therefore, according to this embodiment, the imaging camera 2 is supported on the support member 6 so as to be rotatable over 360° within the horizontal plane, whereby the whole circumference in the horizontal direction can be imaged by one imaging camera 2. However, when the whole circumference is imaged by merely rotating one imaging camera 2, the imaging operation must be carried out at many times, and the number of pickup images 7 increases, so that the image processing is cumbersome. Therefore, according to this embodiment, in order to reduce the imaging frequency required for imaging of the whole circumference and the number of pickup images 7, a super-wide-angle lens 10 is mounted on the imaging camera 2, and the imaging camera 2 picks up images through the super-wide-angle lens 10.

The super-wide-angle lens 10 is a lens having an angle of view α which is equal to at least 120° or more, preferably near to 180° (in this embodiment, 120°). Accordingly, as shown in FIG. 2, the imaging camera 2 picks up images at each observation point P while rotated within the horizontal plane by every angle of view α (=120°), thereby picking up the images of the whole circumference in the horizontal direction.

In place of the super-wide-angle lens 10, a so-called whole circumference fish-eye lens having an angle of view α which is equal to 180° or more may be mounted on the imaging camera 2, thereby further reducing the imaging frequency.

In order to successively determining and outputting values of glare gratings GR in all the horizontal directions on the basis of plural pickup images 7 covering the whole circumference picked up by the imaging camera 2, the processing device 4 has an image pickup unit 20, an image composition unit 22 and a glare calculator 24 as shown in FIG. 1. The processing device 4 can be implemented by making a general-purpose computer such as a personal computer or the like execute software programs for performing the functions of the respective units described above.

The image pickup unit 20 obtains pickup images 7 of the imaging camera 2, and outputs the pickup images to the image composite unit 2. The image pickup unit 20 picks up images through wire communication or radio communication from the imaging camera 2 or picks up images by reading a recording medium (an optical disc, a semiconductor memory or the like, for example) in which images picked up by the imaging camera 2 are recorded, for example.

The image composition unit 22 combines the pickup images 7 in accordance with a glare measurement direction (the view-line direction of players) along which the glare ratings GR are calculated, and outputs the composite images to the glare calculator 24. The glare calculator 24 calculates equivalent veiling luminance on the basis of a thus-combined composite image 30 (see FIG. 5), and calculates the glare ratings GR in the glare measurement direction on the basis of the equivalent veiling luminance.

Describing in more detail, it is known that an image center with respect to the respective pixels of an image as a processing target is set as a standard and the equivalent veiling luminance based on the image processing can be calculated on the basis of a vertical angle from the image center and a solid angle per pixel as described above as disclosed JP-A-2008-241380, for example.

In other words, in order to calculate the equivalent veiling luminance in the glare measurement direction, an image whose center is set to the glare measurement direction is required. Therefore, the image composition unit 22 combines some pickup images 7 each of which has an angle of view α, thereby generating a composite image 30 for calculation of the equivalent veiling luminance.

Figure 3:
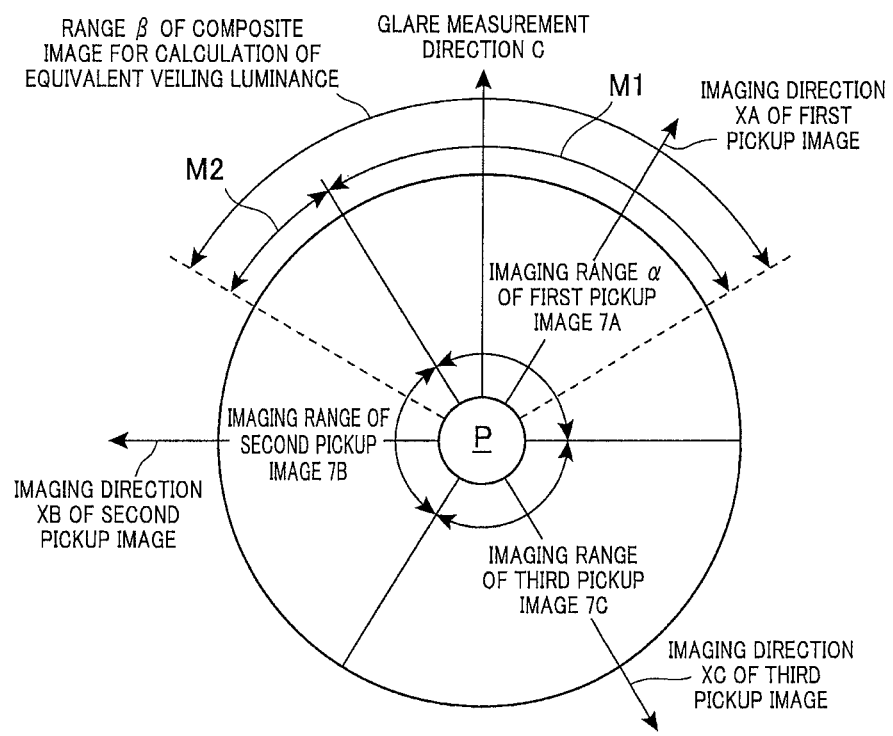
FIG. 3 is a diagram showing visual-line axis conversion and image composition of pickup images.

It is assumed that the angle of view α of the imaging camera 2 is equal to 120°, for example. When images in all the horizontal directions are picked up at an observation point P, three pickup images of a first pickup image 7A to a third pickup image 7C are obtained as shown in FIG. 3. Here, it is assumed that the imaging range required for the composite image 30 for the calculation of the equivalent veiling luminance is represented by β(≥α:β=α in the example of FIG. 3). AB shown in FIG. 3, when the glare measurement direction C is within the range of the first pickup image 7A, the first pickup image 7A and the second pickup image 7B each of which images a part of the imaging range β whose center is set to the glare measurement direction C are used to generate the composite image 30.

When the first pickup image 7A and the second pickup image 7B are combined with each other by merely connecting these pickup images to generate the composite image 30, the center of the composite image 30 is not coincident with the glare measurement direction C, and the range of the composite image is different from the imaging range β. Therefore, when the first pickup image 7A and the second pickup image 73 are combined with each other, each of the first pickup image 7A and the second pickup image 7B as the composite target pickup images 7 are subjected to so-called visual-line axis conversion processing which converts each of the pickup images to an image which is viewed while the glare measurement direction C is matched with the imaging direction. Accordingly, as shown in FIG. 3, ranges M1 and M2 which correspond to the angle of view β of the composite image 30 for the calculation of the equivalent veiling luminance are extracted from the first pickup image 7A and the second pickup image 73 as the composite targets with the glare measuring direction C set to the center. The first pickup image 7A of the range M1 and the second pickup image 7B of the range M2 are combined with each other by connecting these pickup images 7A and 7B, thereby obtaining the composite image 30 having the angle of view β in which the glare measuring direction C is set to the center.

The composite image 30 described above is generated in the image composition unit 22. That is, as shown in FIG. 1, the image composition unit 22 has a measurement direction determining unit 40 for determining the glare measurement direction C, a visual-line axis converting unit 42 for executing the visual-line axis conversion processing on each of the pickup images 7 constituting the composite image 30 in which the glare measurement direction C is set to the center thereof, and an image generator 44 for obtaining the composite image 30 for calculation of the equivalent veiling luminance. In this embodiment, in order to measure the glare ratings GR in all the horizontal directions at the observation point P, the image composition unit 22 generates a composite image 30 having an angle of view β at each angle with the glare measurement direction C set to the center thereof while successively changing the glare measurement direction C around the observation point P at intervals of a predetermined angle, and outputs the generated composite images to the glare calculator 24.

As shown in FIG. 1, the glare calculator 24 has an equivalent veiling luminance calculator 46 and a glare rating calculator 48. The equivalent veiling luminance calculator 46 determines the luminance value of each pixel on the basis of the gradation value of each pixel of the composite image 30 every time the composite image 30 is generated by the image composition unit 22, and calculates the equivalent veiling luminance in the glare measurement direction C from the luminance value of each pixel. The glare rating calculator 48 calculates the glare ratings GR on the basis of the equivalent veiling luminance and outputs the glare ratings GR, whereby the glare ratings in all the horizontal directions with the observation point P set to the center are measured.

Any methods may be used as the method of calculating the equivalent veiling luminance on the basis of the composite image 30 and the method of calculating the glare rating GR on the basis of the equivalent veiling luminance.

Next, the operation of the glare measuring system 1 for the glare estimation of the baseball field F will be described.

Figure 4:
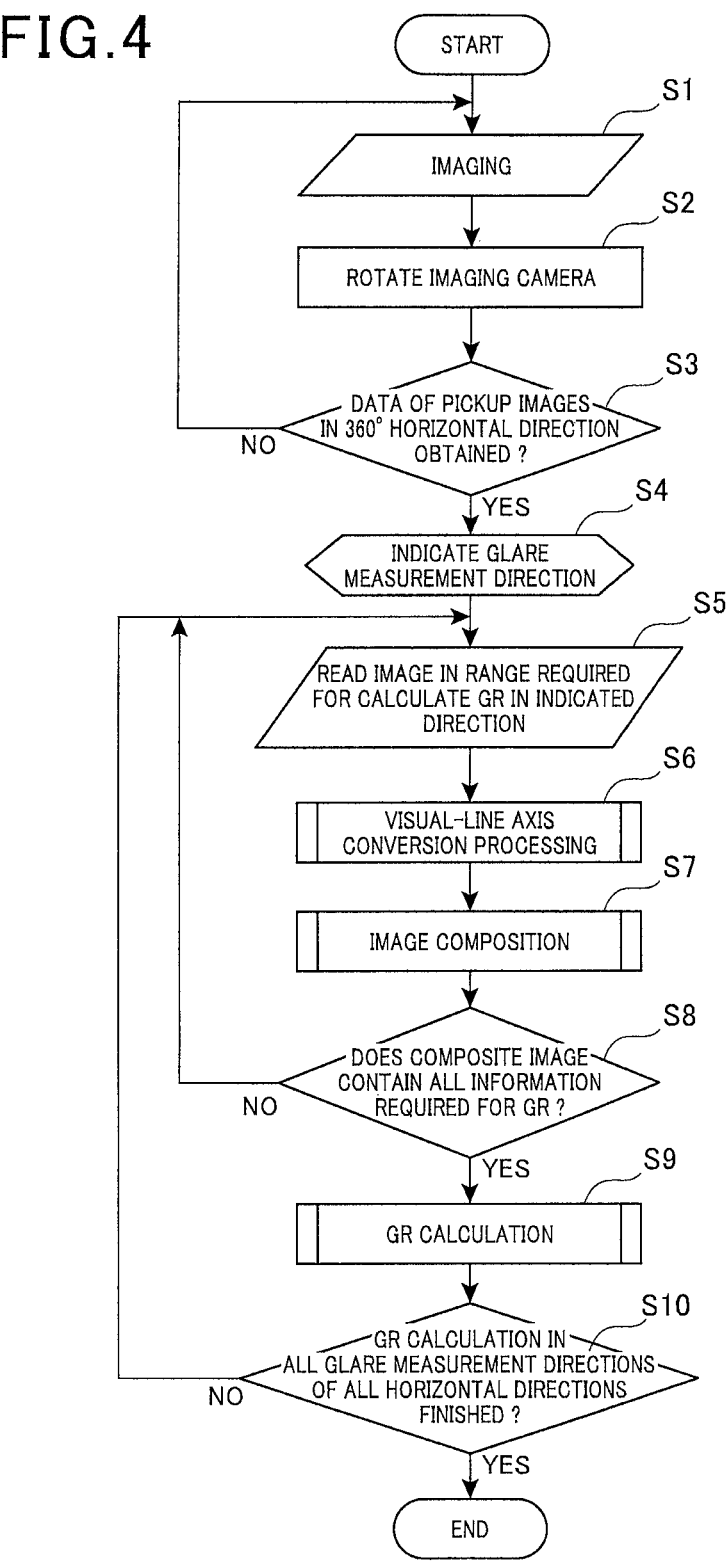
FIG. 4 is a flowchart showing the operation of the glare measuring system.

FIG. 4 is a flowchart showing the operation of the glare measuring system 1.

The worker first sets up the imaging camera 2 having the super-wide-angle lens 10 mounted thereon at an observation point P for glare estimation in the ground J. Then, the imaging operation of the imaging camera 2 (step S1) and the rotation of the imaging camera 2 having an angle of view α (step S2) are repeated to obtain data of plural pickup images 7 so as to cover 360° in the horizontal direction (step S3: YES). These pickup images 7 are input to the processing device 4, and the values of the glare gratings GR are calculated.

Figure 5:
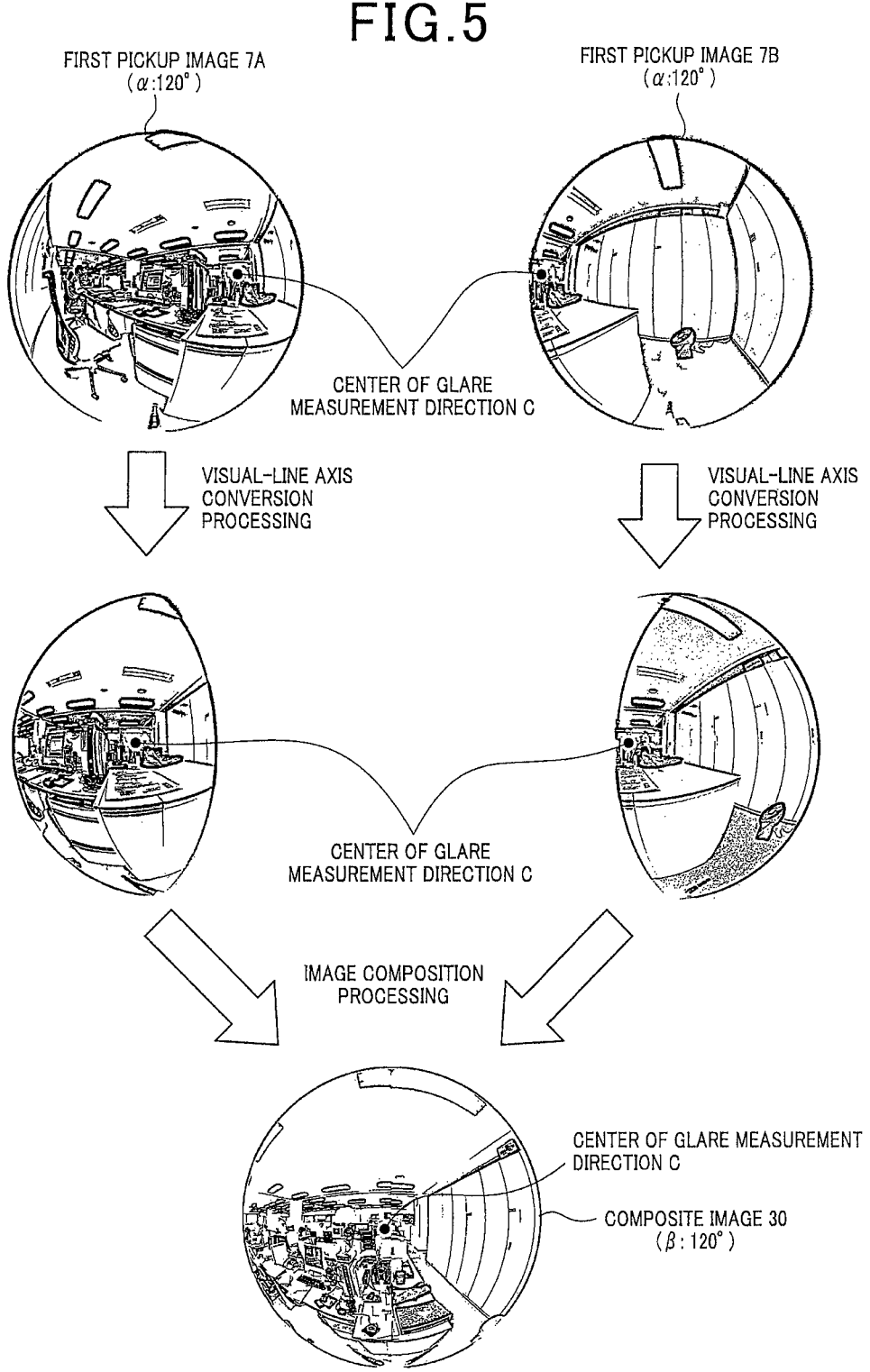
FIG. 5 is a diagram showing an example of visual-line axis conversion processing and image composition processing of the pickup images.

That is, in the processing device 4, when the glare measurement direction C along which the glare rating GR is measured is indicated (step S4), pickup images 7 in the range of a composite image 30 required to calculate the glare rating GR in the glare measurement direction C are read in (step S5). For example, as shown in FIG. 5, when with respect to a certain glare measurement direction C, pickup images required to generate a composite image 30 in which the glare measurement direction C is set to the center thereof are the first pickup image 7A and the second pickup image 7B, these images are read in. Subsequently, the processing device 4 executes the visual-line axis conversion processing on each of the pickup images 7 (step S6), whereby the image is converted to an image in which the glare measurement direction C is set to the imaging direction (the visual-line axis) as shown in FIG. 5, for example. The processing device 4 connects these images to combine these images (step S7), thereby generating the composite image 30 in which the glare measuring direction C is set to the center thereof as shown in FIG. 5, for example. The processing from steps S5 to S7 is repeated until these images cover the range β of the composite image 30 for the calculation of the equivalent veiling luminance (step S8: YES).

Subsequently, the processing device 4 calculates the equivalent veiling luminance on the basis of the composite image 30, and calculates the glare rating GR on the basis of the equivalent veiling luminance (step S9). The processing device 4 successively shifts the glare measuring direction C at intervals of a predetermined angle in the horizontal direction, and repeats the processing of steps S5 to S9 until glare ratings GR in all the directions are determined (step S10: NO). Therefore, the processing is finished (step S10: YES).

As described above, according to this embodiment, the super-wide-angle lens 10 is mounted on the imaging camera 2, and imaging is executed on all the directions within the horizontal plane through the super-wide-angle lens 10 while the imaging camera 2 is rotated within the horizontal plane by every angle corresponding to the angle of view α of the super-wide-angle lens 10.

Accordingly, as compared with a case where imaging is executed through a normal lens having a small angle of view α, the number of pickup images 7 can be reduced, and the processing can be reduced. Furthermore, the cost can be suppressed because all the directions within the horizontal plane can be imaged by one imaging camera 2.

The processing device 4 combines pickup images 7 of the imaging camera 2 to generate a composite image 30 containing the glare measuring direction C at the center thereof as the image for calculating the equivalent veiling luminance, calculates the equivalent veiling luminance on the basis of the composite image 30 and calculates glare in the glare measurement direction C on the basis of the equivalent veiling luminance. Therefore, the glare measurement direction C can be set to any direction, and the value of the glare rating GR in that direction can be easily determined. Particularly, since the angle of view α of the pickup image 7 is large, the number of images to be combined can be reduced, and the processing can be further reduced.

Furthermore, according to this embodiment, the processing device 4 is configured to successively calculate the values of the glare ratings GR in all the directions within the horizontal plane at an observation point P at intervals of a predetermined angle. Therefore, the worker can easily and quickly perform glare estimation at the observation point P.

The embodiment described above is merely an example of the present invention, and any modification and any application may be made without departing from the subject matter of the present invention.

For example, in the above embodiment, the glare estimation is made by using the glare measuring system while the measurement target space is set to the outdoor sports facilities. However, the present invention is not limited to this embodiment. The glare measurement can be performed while any place is set as the measurement target space. Furthermore, the value of the glare rating GR in only a glare measurement direction C indicated by a user may be determined by using the glare measuring system 1 in place of determination of the values of the glare ratings GR in all the directions within the horizontal plane.

Furthermore, the above embodiment has the glare measuring system 1 in which the imaging camera 2 as imaging means and the processing device 4 as processing means are provided separately from each other. However, the imaging camera 2 and the processing device 4 may be designed as an all-in-one device.

In the above embodiment, the glare rating GR is determined as glare to be calculated on the basis of the equivalent veiling luminance by the processing device 4 of the glare measuring system 1. However, the present invention is not limited to this embodiment. Any glare determined from the equivalent veiling luminance may be calculated.

For example, disability glare TI and discomfort glare G which are used for glare estimation of road lighting may be used as the glare described above.

Specifically, the disability glare TI and the discomfort glare G are used to estimate glare in terms of vehicle drivers under road lighting. It is known that the disability glare TI has a correlation with the average road surface luminance and the equivalent veiling luminance and is determined on the basis of these values. It is also known that the discomfort glare G is calculated on the basis of the equivalent veiling luminance.

Therefore, the road surface is imaged by the imaging camera 2 to obtain a pickup image 7 of the road surface, the processing device 4 converts the gradation values of the respective pixels of the pickup image 7 to luminance values and averages the luminance values to calculate an average road surface luminance. Furthermore, the processing device 4 calculates the equivalent veiling luminance on the basis of the luminance distribution of the pickup image 7, calculates the disability glare TI on the basis of the average road surface luminance and the equivalent veiling luminance, and calculates the discomfort glare G on the basis of the equivalent veiling luminance. Any methods may be used as the method of determining the disability glare TI from the average road surface luminance and the equivalent veiling luminance and the method of determining the discomfort glare G from the equivalent veiling luminance. When color skip occurs in the pickup image 7 due to a brightness object existing in the imaging range of the imaging camera 2, the color skip can be suppressed by mounting a neutral density filter as well as the super-wide-angle lens 10 on the imaging camera 2.

Accordingly, the disability glare TI and the discomfort glare G required for the glare estimation of the road lighting can be simultaneously, easily and accurately obtained from the pickup image 7, and thus a luminance meter on which a glare lens is mounted is unnecessary, so that these values can be accurately obtained at low cost.

It has been hitherto necessary in the prior and existing measurement that the average road surface luminance is measured to determine the disability glare TI and the equivalent veiling luminance is measured separately from the measurement of the average road surface luminance to determine the discomfort glare G, so that the measurement is cumbersome. However, according to this modification, the disability glare TI and the discomfort glare G can be obtained at the same time, and thus the measurement can be performed in shorter time with high precision.

Furthermore, the processing device 4 executes the visual-line axis conversion processing and the image composition processing on the pickup images 7 in all the horizontal directions at the observation point P in conformity with the glare measurement direction C to obtain the glare in the glare measurement direction C. Therefore, any direction on the road surface can be set to the visual line direction of a vehicle driver, and the disability glare TI and the discomfort glare G in this visual line direction can be easily determined.

It is needless to say that the glare measuring system 1 is configured to calculate only one of the disability glare IT and the discomfort glare G in the glare estimation of the road lighting.

Figure 6:
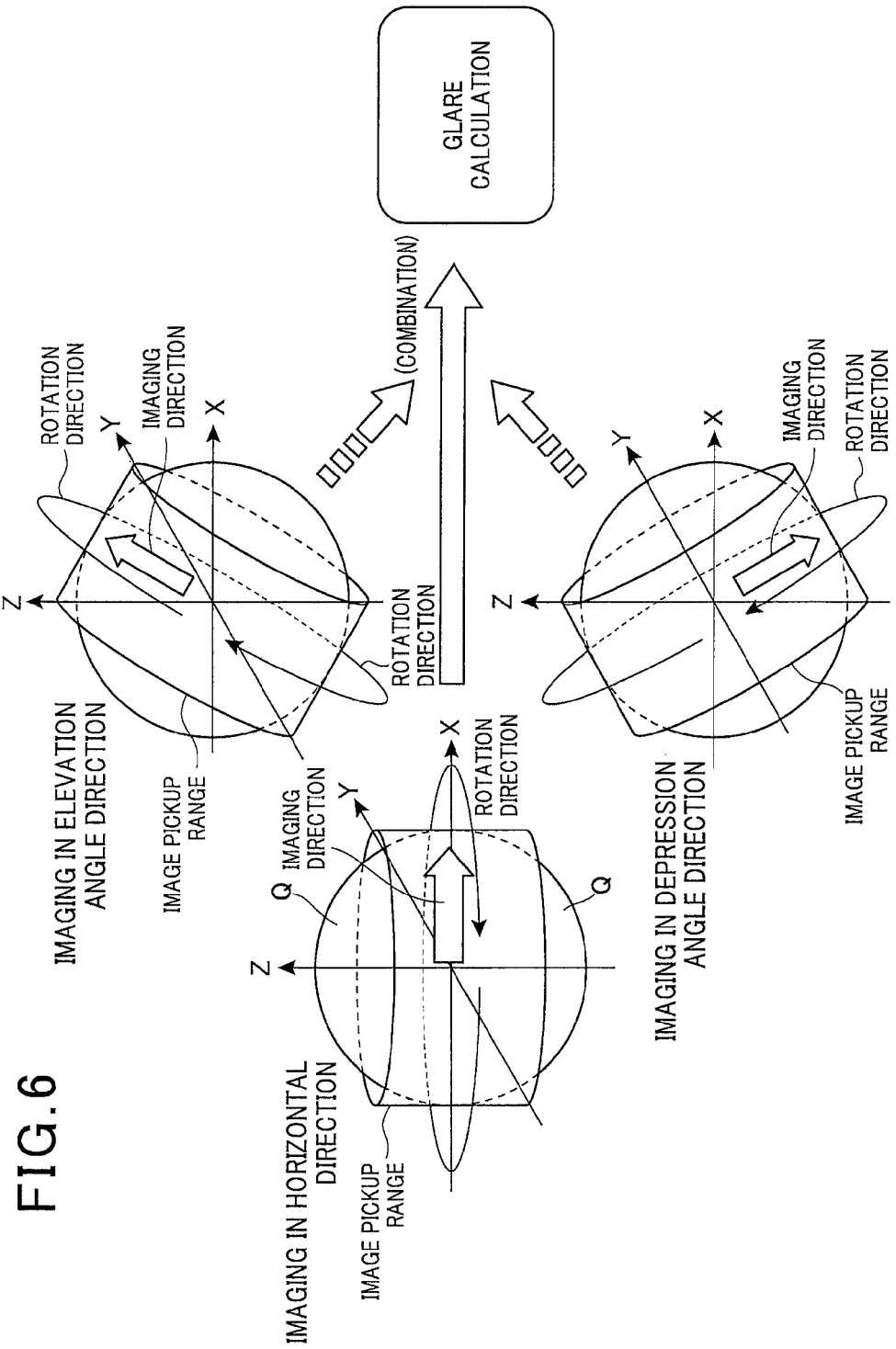
FIG. 6 is a diagram showing a modification of the image pickup operation of the present invention.

Furthermore, in the above embodiment, the imaging camera 2 is configured to be rotated within the horizontal plane by 360°. In this case, when the XY plane of the XYZ three-dimensional space is set to the horizontal plane as shown in FIG. 6, defective areas Q in which a part in the Z-axis direction corresponding to the vertical direction is not imaged occur due to the angle of view α of the imaging camera 2. The defective area Q is larger as the angle of view α of the imaging camera 2 is smaller, and affects the value of the glare.

Therefore, as shown in FIG. 6, imaging is executed over the whole periphery of 360° under each of a state where the imaging camera 2 is tilted in a depression angle direction (in a vertically downward direction: Z-axis negative direction) with respect to the horizontal plane and a state where the imaging camera 2 is tilted in an elevation angle direction (in a vertically upward direction: Z-axis positive direction) with respect to the horizontal plane so that the defective areas Q occurring due to the angle of view α of the imaging camera 2 are contained in the imaging range, and the processing device 4 combines the respective pickup images 7 to generate a composite image 30 in which the defective areas Q are supplemented in the pickup images 7 in the depression angle direction and in the elevation angle direction, and calculates glare on the basis of the composite image 30.

Furthermore, in the above embodiment, the circumference is imaged while the imaging camera 2 is rotated within the horizontal plane. However, the imaging camera 2 is not necessarily rotated within the horizontal plane insofar as the imaging camera 2 is rotated within a flat plane so as to image the circumference.

DESCRIPTION OF REFERENCE NUMERALS

1 glare measuring system
2 imaging camera (imaging means)
4 processing means
7 pickup image
8 lighting equipment
10 super-wide-angle lens (wide angle lens)
22 image composition unit
24 glare calculator
30 composite image
40 measurement direction determining unit
42 visual-line axis converter
44 image generator
46 equivalent veiling luminance calculator
48 glare rating calculator
C glare measurement direction
G discomfort glare (glare)
GR glare rating (glare)
P observation point
TI disability glare (glare)

The invention claimed is:

1. A glare measuring system comprising:
a camera that is supported to be rotatable within a flat plane; and
a computer that calculates an equivalent veiling luminance based on a luminance distribution of an image picked up by the camera and calculates a value of glare based on the equivalent veiling luminance and an average luminance of the captured image, wherein
the camera has a lens mounted thereon and picks up the image through the lens in a position that is rotated within the flat plane at intervals of an angle corresponding to an angle of view of the lens, thereby imaging all directions within the flat plane,
a glare measurement direction and a glare imaging range are set within the flat plane the glare measurement direction being at a center of the glare imaging range and being different from a center of the angle of view,
each of the pickup images is imaged through the lens, and
the computer converts each of the pickup images that cover the glare imaging range into a converted image in which an imaging direction is the glare measurement direction, and combines the converted images to generate a combined image in which the glare measurement direction is at a center of the combined image, calculates the equivalent veiling luminance based on the luminance distribution of the combined image and calculates the value of glare in the glare measurement direction based on the equivalent veiling luminance and an average luminance of the combined image.

2. The glare measuring system according to claim 1, wherein the computer calculates at least one of a glare rating used for glare estimation of sports lighting, disability glare used for glare estimation of road lighting and discomfort glare as the value of the glare.

3. The glare measuring system according to claim 1, wherein
the camera picks up images over a whole periphery of 360° under each of a state where the camera is tilted in a depression angle direction with respect to a horizontal plane and a state where the camera is tilted in an elevation angle direction with respect to the horizontal plane so that defective areas occurring due to the angle of view of the lens of the camera are contained in the glare imaging range, and
the computer combines the respective images to generate the combined image in which the glare measurement direction is set to a center of the image.

4. The glare measuring system according to claim 1, wherein the lens is a wide-angle lens.

5. The glare measuring system according to claim 1, wherein a single glare measurement direction is set in the flat plane, said glare measurement direction being a view-line direction of players for which the glare measuring system is used.

6. The glare measuring system according to claim 1, wherein the computer successively calculates the value of glare in all directions within the flat plane at intervals of a predetermined angle.

7. The glare measuring system according to claim 6, wherein the computer calculates at least one of a glare rating used for glare estimation of sports lighting, disability glare used for glare estimation of road lighting and discomfort glare as the value of the glare.

8. A method for glare measuring comprising the steps of:
picking up images from a camera that is supported to be rotatable within a flat plane and has a lens mounted thereon, and picks up the images through the lens in a position that is rotated within the flat plane at intervals of an angle corresponding to an angle of view of the lens, thereby imaging all directions within the flat plane in which at least one glare measurement direction and at least one glare imaging range are set, the glare measurement direction being at a center of the glare imaging range and being different from a center of the angle of view;
converting each of the pickup images that cover the glare imaging range into converted images in each of which an imaging direction is the glare measurement direction;
combining each of the converted images to generate a combined image in which the glare measurement direction is a center of the image; and
calculating an equivalent veiling luminance based on a luminance distribution of the combined image calculating a value of glare based on the equivalent veiling luminance and an average luminance of the combined image.

* * * * *